Sept. 26, 1933.     E. V. TAYLOR     1,928,079
BRAKE
Filed Dec. 3, 1931
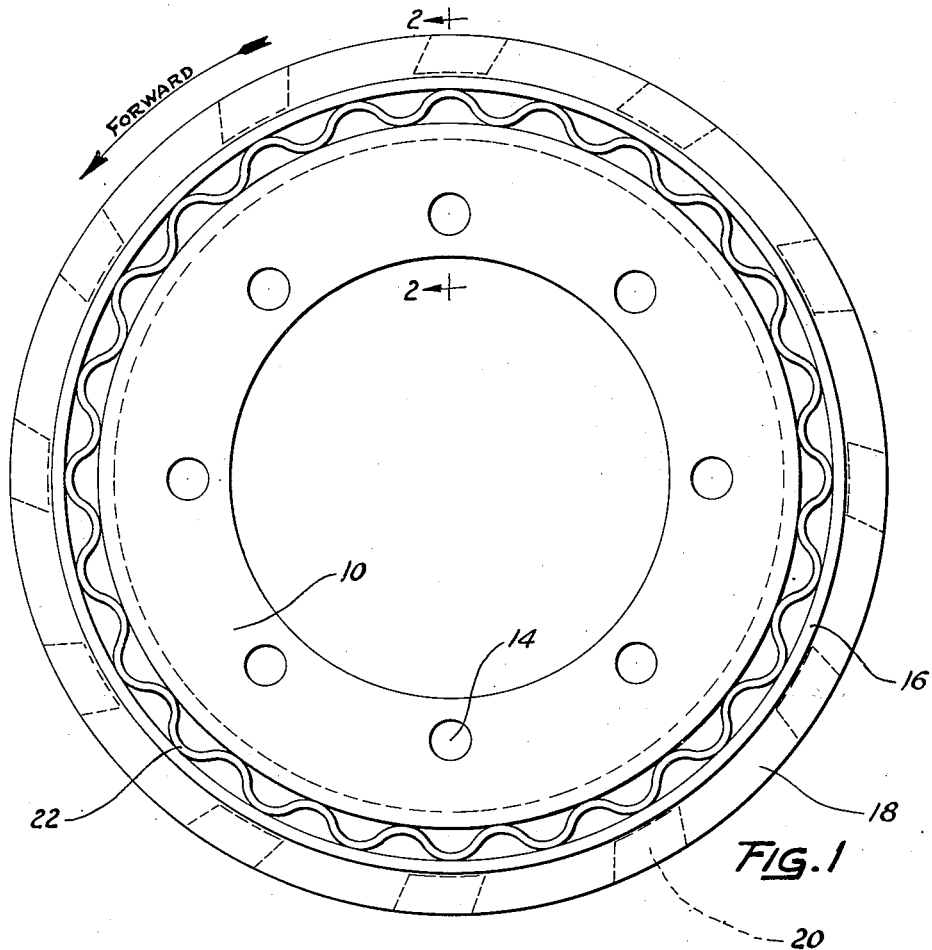
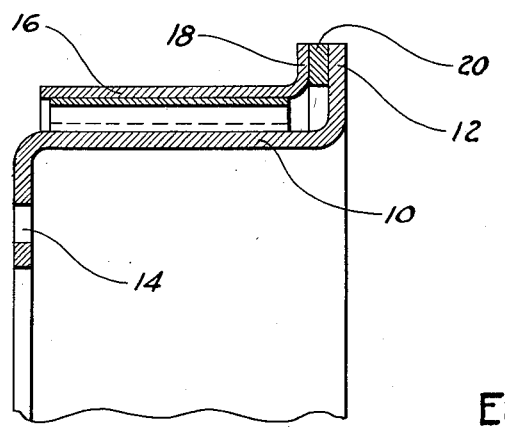
INVENTOR.
EUGENE V. TAYLOR
BY O. H. Fowler
ATTORNEY

Patented Sept. 26, 1933 1,928,079

UNITED STATES PATENT OFFICE 1,928,079

BRAKE

Eugene V. Taylor, Chicago, Ill., assignor to Bendix Aviation Corporation, South Bend, Ind., a corporation of Delaware Application December 3, 1931. Serial No. 578,796

6 Claims. (Cl. 188—218)

This invention relates to motor vehicles and more particularly to brake drums.

Broadly, the invention comprehends a brake drum including concentric members retained in spaced relation by a resilient member arranged to provide ventilating means. The concentric members, one of which has a breaking surface, may be constructed of relatively thin material since these members are trussed together by the resilient member. The concentric members are further secured together by suitable spacers arranged to cause suction of air between the concentric members.

As shown, a drum of relatively thin material is provided with conventional means for attachment to a wheel and the conventional flange. An outer annular member arranged concentrically to the drum is provided with a flange the over all diameter of which is equal to the over all diameter of the flange on the drum. Arranged in spaced relation between the flanges of the drum and the annular member are suitable spacers which may be spot-welded or otherwise secured to the flanges to retain the drum and annular member in spaced relation. These spacers are of such contour that when the drum is rotating in the forward direction they will cause suction of air between the drum and the annular member. Positioned between the drum and the annular member is a corrugated spring steel band which materially strengthens the structure and also provides suitable air passages between the drum and the annular member.

An important object of the invention is to provide a brake drum of relatively thin material.

Another important object of the invention is to provide a brake drum with means for readily dissipating heat generated in the braking surface of the drum.

A still further object of the invention is to provide a brake drum including concentric members connected by a corrugated reinforcing ring or band providing air passages for dissipating heat generated in the structure.

Yet a further object of the invention is to provide a brake drum including concentric members secured together by a reinforcing member comprising a corrugated ring, and means associated therewith for causing suction of air through channels or air ducts formed by the concentric members in conjunction with the reinforcing member.

A feature of the invention is a brake drum including concentric members and a corrugated reinforcing ring or band secured between the members.

Another important feature of the invention is a brake drum including concentric members having parallel flanges, a corrugated reinforcing ring secured between the concentric members and members arranged in spaced relation between the flanges, so that in forward rotation of the drum suction is created between the concentric members for the dissipation of heat.

The above and other objects and features of the invention including various details of structure will be apparent from the following description of the illustrated embodiment shown in the accompanying drawing, in which:

Figure 1 is a side elevation of a brake drum illustrating the invention as applied; and Figure 2 is a sectional view substantially on line 2—2, Figure 1.

Referring to the drawing for more specific details of the invention, 10 represents a brake drum having a flange 12. The drum may be of any desired structure having conventional means such as shown at 14 for attachment to a wheel, not shown. This drum may be constructed of relatively thin material because of the super-imposed structure which lends great strength and rigidity thereto.

Arranged concentrically to the drum 10 is an outer drum 16 having a flange 18 of the same over all diameter as the over all diameter of the flange 12, and arranged in spaced relation between the flanges 12 and 18 are suitable spacers 20. These spacers are of such contour that when the drum is rotating in the forward direction, as indicated by an arrow in Figure 1, they will cause suction between the flange 12 and the flange 18. As shown the spacers have parallel edges positioned in cords intersecting the drum. The drum 16 may also be constructed of relatively thin material, so that the combined weight of both the drum 10 and the drum 16 will not exceed the weight of the conventional drums now in use.

Arranged between the flange 12 and the flange 18 is a corrugated reinforcing ring or band 22 which may be spot-welded or otherwise secured to the flanges of inner and outer drums. This corrugated reinforcing ring lends strength and rigidity to the structure, and in addition thereto provides a plurality of equally spaced and balanced or symmetrical conduits or air ducts for the passage of air between the flange on the inner drum and the flange on the outer drum, so that upon generation of heat in the inner drum due to the application of friction elements, the heat may be readily dissipated by currents of air caused to circulate between the flanges 12 and 18 by suction created between the spacers 20 arranged between the flanges on the respective drums.

Although this invention has been described in connection with certain specific embodiments, the principles involved are susceptible of numerous other applications that will readily occur to persons skilled in the art. The invention is, therefore, to be limited only as indicated by the scope of the appended claims.

I claim:

1. A brake drum comprising concentric flanges and a corrugated band between the flanges.

2. A brake drum comprising concentric members, and a corrugated member arranged between the concentric members retaining the concentric members in spaced relation.

3. A brake drum comprising concentric members, a flange on each member, and spacers between the flanges.

4. A brake drum comprising concentric members, a flange on each of the members, and spacers between the flanges having parallel edges positioned in cords intercepting the members.

5. A brake drum comprising a braking flange, an annular member arranged concentrically thereon, a corrugated band between the outer wall of the braking flange and the inner wall of the annular member, flanges on the braking flange and the annular member, and spacers between the flanges.

6. A brake drum comprising concentric members each having a flange of the same over all diameter, spacers secured between the flanges and arranged to cause suction of air between the members, and means trussing the annular members together including a corrugated band secured to the members.

EUGENE V. TAYLOR.